US012789813B2

(12) United States Patent
Kosioris et al.

(10) Patent No.: US 12,789,813 B2
(45) Date of Patent: Nov. 10, 2026

(54) METHOD FOR CONTROLLING A ROBOT DEVICE

(71) Applicant: Robert Bosch GmbH, Stuttgart (DE)

(72) Inventors: Panagiotis Kosioris, Urbach (DE); Peter Bakucz, Klosterlechfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 19/246,863

(22) Filed: Jun. 24, 2025

(65) Prior Publication Data

US 2026/0008469 A1 Jan. 8, 2026

(30) Foreign Application Priority Data

Jul. 2, 2024 (DE) ..................... 10 2024 206 172.7

(51) Int. Cl.

*B60W 30/182* (2020.01)
*B60W 50/00* (2006.01)
*B60W 50/02* (2012.01)
*B60W 50/029* (2012.01)
*B60W 60/00* (2020.01)

(52) U.S. Cl.

CPC ...... *B60W 30/182* (2013.01); *B60W 50/0205* (2013.01); *B60W 50/029* (2013.01); *B60W 60/0018* (2020.02); *B60W 2050/0083* (2013.01); *B60W 2050/0292* (2013.01)

(58) Field of Classification Search

CPC ........... B60W 30/182; B60W 50/0205; B60W 50/029; B60W 60/0018; B60W 2050/0083; B60W 2050/0292; B25J 9/1656; B25J 9/1602; B25J 9/1697

See application file for complete search history.

(56) References Cited

U.S. PATENT DOCUMENTS

2023/0202034 A1* 6/2023 Guo ......................... B25J 9/161 700/253

FOREIGN PATENT DOCUMENTS

DE 102017218889 A1 * 4/2019 ............. G06N 3/045

OTHER PUBLICATIONS

Machine Translation DE-102017218889-A1 (Year: 2017).*

* cited by examiner

*Primary Examiner* — Anne Marie Antonucci
(74) *Attorney, Agent, or Firm* — NORTON ROSE FULBRIGHT US LLP

(57) ABSTRACT

A method for controlling a robot device. For each processing module of one or more processing modules of a control system of the robot device, the method includes: representing each signal value of a plurality of signal values received or generated by the processing module as at least one first binary value that indicates whether the signal value, or a respective value which is derived from and characterizes the signal value, has a respective standard value or not; generating a plurality of random second binary values; ascertaining a parameter of a probability distribution that describes the joint distribution of a set of binary values containing the first binary values and the second binary values; ascertaining an evaluation of the functionality of the processing module based on the ascertained parameter; setting an operating mode of the control system depending on said evaluation; and controlling the robot device using an output.

10 Claims, 4 Drawing Sheets

METHOD FOR CONTROLLING A ROBOT DEVICE

FIELD

The present invention relates to methods for controlling a robot device, in particular with a high degree of reliability and fault tolerance.

BACKGROUND INFORMATION

The computational demands on modern automotive systems include constant connectivity to the Internet, fully customizable driving behavior and driving experience and personalized functionalities. With the help of zonal E/E (electronic/electronic) architectures, new functions are implemented primarily by means of software and can be made available to the vehicle through regular updates. The transition from the current flat E/E automotive architectures to consolidated zonal architectures includes a number of intermediate steps, such as a central gateway, domain control devices and distributed zonal architectures. All of these intermediate steps introduce new device classes, communication topologies and implementations, such as powerful modular computers with mixed functions, high-speed communication backbones and modular software as a service (Saas), that aim to reduce hardware and cabling and increase functionality. Taking into account the physical characteristics of the vehicle, three classes of devices are distinguished in a zonal architecture.

Central computers or vehicle servers provide a new level of high performance that can support the service-oriented approach. The purpose of the vehicle server is to reduce the number of physical control devices in the vehicle by consolidating the hardware components.

Zonal gateways function as a local connectivity hub that aggregates multiple (mostly older) low-speed interfaces and forwards the data to the respective backbone via a single high-speed connection (e.g. Ethernet). Zonal gateways can also carry out edge processing and prepare or offload data for processing by a vehicle server to reduce workload and bandwidth.

Edge devices such as sensors and actuators, as well as older control devices, remain the same as in other architectures.

The key concept of vehicle servers is to divide a fixed ratio of computing, storage and network performance into separate pools that can be interconnected or, if necessary, combined into logical systems that are optimized for specific applications. Vehicle servers do not need to consist of a single physical device; they can be implemented as modular servers by interconnecting multiple high-performance control devices, clustering system-on-chip (SoCs) on the same printed circuit board (PCB), or using a base backplane with expansion cards. The last mentioned approach, also known as a rack, provides the ability to consolidate the control devices distributed in the vehicle into one housing. A representative example of this concept is the L4 Automated Driving (AD) rack design. The L4 AD rack architecture aims to house a dual modular redundant (DMR) set of control devices for automated driving (ADC) and enables a significant reduction in the required wiring harness compared to other functionally equivalent approaches.

In general, an automated driving system (ADS) can be described in terms of aspects based on the methodology of model-based system engineering (MBSE): the requirements, the functional, the logical or application-related, and the technical or physical aspects. The ADS can also be defined as a system of systems (Sos) that is also an element of the system of interest (SoI); in this case, an autonomously driving vehicle (ADV) according to the system (SyS) abstraction.

Up to Level 2 of the Society of Automotive Engineers (SAE) for automated driving systems (so-called driver assistance), which includes all current systems and also the current "autopilot", the driver must be ready at all times to immediately take over the driving task if such passivation occurs and is signaled. Safety is ensured as long as the failed system does not act against the driver. This is ensured by the "fail-safe" approach. The respective control device continuously monitors its safety integrity (SaI). If it encounters an error, it switches itself to passive mode.

The situation becomes more complex at SAE Level 3 (conditional automation). Here, the driver still has be ready to take over the driving task, but only after a sufficient period of time granted by the automation system after it detects a malfunction or some other limitation, e.g. by means of a sensor. The driver has to be given a longer period of time because, in step 3, the driver is no longer required to constantly monitor the surroundings of the vehicle and the system limits.

With Level 4 and Level 5 automated driving, things change fundamentally. In the event of a malfunction, there is no longer a driver to take control of the vehicle. The car can be empty or occupied by children. If the compulsory automated system fails, the car must continue driving or at least safely reach a location with minimal risk at which it can stop and wait for (human) assistance. Continuing the trip or safely terminating the trip has thus become a critical component of the safety objective; i.e. the safety objective can only be achieved if availability is maintained. The availability required to achieve the safety objective is referred to as safety-related availability (SaRA). A vehicle can meet both SaI and SaRA requirements by simply driving to the next safe stopping point. This is not typically what passengers are expecting, and therefore can lead to frustration. Mission-related availability (MiRA) is the availability that is needed to satisfy the customer. It can be higher than the SaRA. This depends on the use case; e.g. private car, public taxi, delivery van, etc.

SUMMARY

According to various embodiments of the present invention, a method for controlling a robot device is provided, which, for each processing module of one or more processing modules of a control system of the robot device is provided. According to an example embodiment of the present invention, the method comprises: representing each signal value of a plurality of signal values received or generated by the processing module as at least one first binary value that indicates whether the signal value, or a respective value which is derived from and characterizes said signal value, has a respective standard value or not; generating a plurality of random second binary values; ascertaining a parameter of a probability distribution that describes the joint distribution of a set of binary values containing the first binary values and the second binary values; ascertaining an evaluation of the functionality of the processing module based on the ascertained parameter; setting an operating mode of the control system depending on said evaluation; and controlling the robot device using an output of the processing module.

If a respective evaluation is ascertained for multiple processing modules, these could be combined to an overall evaluation and the operating mode could be set depending on said overall evaluation.

The above-described method of the present invention makes it possible to monitor a control system by effectively evaluating the functionality of modules of a control system, and thus also of groups of modules of the control system, such as various processing chains, and respond appropriately, in particular in a real-time environment. In particular the reliability of the control can be evaluated and, if necessary, a safety measure can be implemented; for example a safe mode (e.g. stopping a vehicle) or switching to redundant elements.

In the case of autonomous driving (AD), for instance, the evaluation is an AD QoS (quality of service) value. It can be used within an AD rack architecture, which is thus capable of operating in a fault-tolerant manner and supporting SAE Levels 3 (L3), 4 (L4) and 5 (L5) that require improved fail-safe operating behavior.

It is in particular possible to detect an anomaly in the processing of the control system and react to it by changing the operating mode.

In data analysis (here, the analysis of the various signals received or generated by the processing module), the detection of anomalies (also referred to as outlier detection and sometimes as novelty detection) is generally understood to mean the identification of rare elements, events or observations that deviate significantly from the majority of the data and do not correspond to a precisely defined notion of normal behavior. Such anomaly detection is carried out according to various embodiments by ascertaining the parameter based on the binary values.

A variety of embodiment examples of the present invention are specified in the following.

Embodiment example 1 is a method for controlling a robot device as described above.

Embodiment example 2 is the method according to embodiment example 1, wherein the control system comprises at least two (redundant) processing chains, of which one processing chain is active (i.e. currently being used to control the robot device) and at least one processing chain serves as fallback (i.e. failure protection), wherein the processing module (or, in the case of multiple, the processing modules for each of which an evaluation is ascertained) is part of the active processing chain, and wherein setting the operating mode comprises switching from the active processing path to a processing path of the at least one processing path that serves as fallback (and, as a result of the switching, becomes the active processing path), depending on the evaluation.

An evaluation can also be ascertained for a processing chain serving as fallback, for instance, (or for each one if there are multiple serving as fallback), and a switch is made to a processing chain (which then is the active processing chain) if it has a better evaluation than the (currently) active processing chain (e.g. if the evaluation of the active processing chain falls below a specific threshold value).

Embodiment example 3 is the method according to embodiment example 1 or 2, wherein the evaluation is an estimation of the conditional probability that one of the binary values indicates that the signal value or the value derived from it has the respective standard value, provided (i.e. this is the condition for the conditional probability) that each binary value of a specific first number of at least some of the binary values indicates that the respective signal value or the respective value derived from it has the respective standard value and each binary value of a specific second number of at least some of the binary values indicates that the respective signal value or the respective value derived from it does not have the respective standard value.

Such a conditional probability is denoted below as $p_{i,j}$. The evaluation can be a maximum over these conditional probabilities (in particular over all of the possible values for the first number (i.e. over all numbers up to the number of binary values) (and thus one of the conditional probabilities, namely a maximum thereof)). Ascertaining the evaluation in this way can be carried out with little computational effort and thus enables an evaluation in real time and, consequently, real-time response to malfunctions. The binary values can be ordered, and the portion of the binary values can be the binary values to which the conditional probability refers.

Embodiment example 4 is the method according to embodiment example 3, comprising calculating the estimate of the conditional probability based on an estimate of the probability that a given binary value of the binary values indicates the standard value, wherein the estimate of the probability is ascertained by averaging the binary values and based on an estimate of the correlation of the binary values, wherein the estimate of the correlation is ascertained by averaging pairwise products of the binary values.

The estimation of the conditional probability can thus be carried out with little computational effort, which further contributes to the real-time capability of the monitoring.

Embodiment example 5 is the method according to embodiment example 4, comprising ascertaining the estimate of the conditional probability by linearly linking the first number, the second number, the estimate of the probability that a given binary value of the binary values indicates the standard value, and the estimate of the correlation of the binary values.

Modeling the conditional probability using a linear relationship between the aforementioned quantities makes it possible to keep the computational effort low, which further contributes to the real-time capability of the monitoring.

Embodiment example 6 is the method according to one of embodiment examples 1 to 5, wherein setting the operating mode of the control system comprises selecting an operating mode from a set of operating modes that differ in how autonomous the robot device is in the operating modes.

Embodiment example 7 is the method according to embodiment example 6, wherein the operating mode is set such that the lower the evaluation of the functionality of the processing module, the lower the autonomy of the robot device (which is reflected in an overall evaluation of a processing chain containing the processing module, for example).

Embodiment example 8 is the method according to embodiment example 6 or 7, wherein the robot device is a vehicle and the set of operating modes includes an operating mode in which the vehicle drives autonomously.

Embodiment example 9 is a control device (e.g. vehicle control device) configured to carry out a method according to one of embodiment examples 1 to 8.

The control system is part of the control device, for example.

Embodiment example 10 is a computer program comprising instructions that, when executed by a processor, cause said processor to carry out a method according to one of embodiment examples 1 to 8.

Embodiment example 11 is a computer-readable medium which stores instructions that, when executed by a processor, cause said processor to carry out a method according to one of embodiment examples 1 to 8.

In the figures, like reference signs generally refer to the same parts throughout the different views. The figures are not necessarily to scale, wherein emphasis is instead generally placed on representing the principles of the present invention. Various aspects are described in the following description with reference to the figures.

BRIEF DESCRIPTION OF EXAMPLE EMBODIMENTS

DETAILED DECRIPTION OF EXAMPLE EMBODIMENTS

The following detailed description relates to the accompanying drawings, which, for clarification, show specific details and aspects of this disclosure in which the present invention can be implemented. Other aspects can be used, and structural, logical, and electrical changes can be carried out without departing from the scope of protection of the present invention. The various aspects of this disclosure are not necessarily mutually exclusive since some aspects of this disclosure can be combined with one or more other aspects of this disclosure to form new aspects.

Different examples of the present invention are described in more detail in the following.

Figure 1:
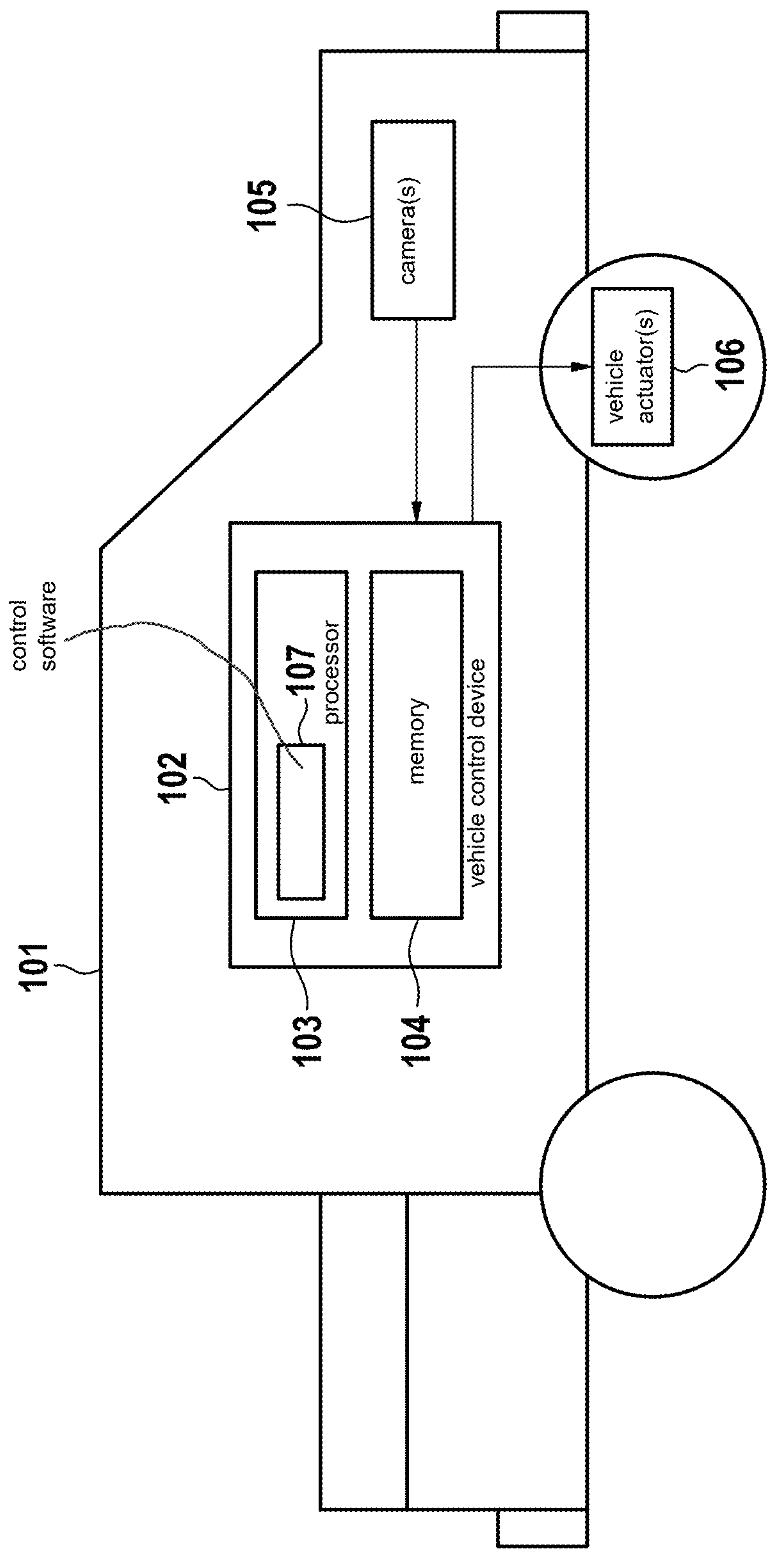
FIG. 1 shows an (e.g. autonomous) vehicle.

FIG. 1 shows an (e.g. autonomous) vehicle 101.

In the example of FIG. 1, the vehicle 101, for example a car or truck, is provided with a vehicle control device 102.

The vehicle control device 102 comprises data processing components, e.g. a processor (e.g. a CPU (central processing unit)) 103 and a memory 104 for storing control software according to which the vehicle control device 102 operates, and data that are processed by the processor 103.

The data stored in the memory 104 can include sensor data, for example image data, acquired by one or more cameras 105. The one or more cameras 105 can, for example, take one or more grayscale or color photos of the surroundings of the vehicle 101. The vehicle control device 102 can then acquire its surroundings based on the sensor data, and, for example based on the image data, ascertain which lane the vehicle 101 is in and where other road users are located. Further processing can then be based on such a perception until control signals for vehicle actuators 106 are output, e.g. a brake or even a steering system.

Figure 2:
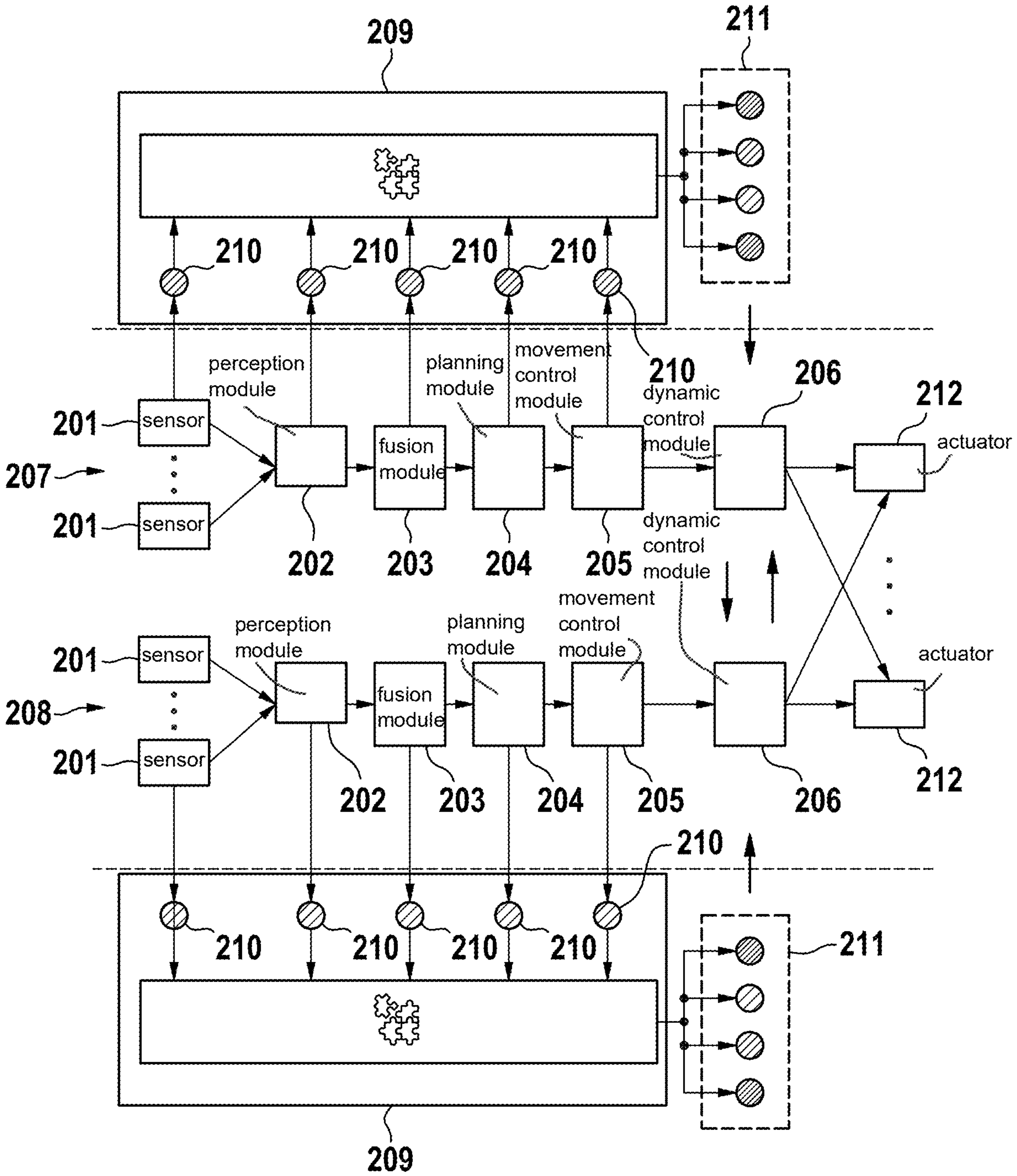
FIG. 2 shows a processing chain for (at least partially autonomous) control of a vehicle.

This processing can be carried out by a plurality of successive (processing) modules, i.e. by a processing chain implemented by a plurality of modules as shown in FIG. 2.

FIG. 2 shows a processing chain for (at least partially autonomous) control of a vehicle.

As described with reference to FIG. 1, sensors 201 acquire sensor data that is initially processed by a perception module 202 (e.g. detection of other road users, localization of the ego vehicle, i.e. the vehicle to be controlled that contains the processing chain). Since sensor data can be acquired by different sensors 201, in this example the perception results are fused by a fusion module 203. A planning module 204 then plans the behavior of the vehicle and a movement control module 205 ascertains an appropriate movement of the vehicle (within the planned behavior, e.g. movement that is physically possible for the vehicle). Its dynamic control module 206 then ascertains the control signals for the actuators 212.

For safety reasons, two instances 207, 208 of the processing chain are provided in the example of FIG. 2.

One instance of the processing chain 207, 208 can be active and the other can be used as fallback; e.g. if the processing quality (e.g. in the form of a quality of service (QoS), i.e. a QoS status, such as an operating ability) of the active processing chain deteriorates. For such a functionality, each processing chain 207, 208 comprises a respective verification module (or monitoring module) 209 that outputs an evaluation of the12rocesssing quality of the respective processing chain 207, 208. Based on an evaluation 211 of the processing quality, hereinafter also referred to as AD (autonomous driving) QoS, for example, and shown in FIG. 2 as an indication of one of four classes, the system then switches which processing chain 207, 208 is active, for example, or a specific, e.g. safer, driving mode is set (in particular if neither of the two processing chains provides a sufficiently high processing quality). If the processing quality (e.g. of both processing chains 207, 208) deteriorates, for instance, the system can switch from fully autonomous driving to a limited autonomous driving mode (in which the driver has to assist) or, in the worst case, even carry out an emergency maneuver or at least a controlled stop.

Each system has specific capabilities that are defined during its development phase. These capabilities relate to performance, integrity or availability. The status of these capabilities can be represented by a discrete level (achieved or not achieved). A disadvantage of using a discrete level is that some factors (if they have a specific discrete value) can also cause a specific discrete system behavior, which increases the likelihood of premature termination (and, for example, initiation of an emergency maneuver). This can significantly impair driving performance, and thus in particular can lead to low user satisfaction.

According to various embodiments, a numerical (continuous) value is therefore used to evaluate the processing quality of a processing chain 207, 208, which is referred to in the following examples as AD QoS (AD quality of service) and is ascertained repeatedly in real-time (i.e. for example periodically in accordance with a verification interval) during system run-time; i.e. the control of the respective vehicle by means of the (active) processing chain 207, 208.

According to various embodiments, this value, i.e. an individual evaluation 210, is ascertained individually for each module 202-205 by the verification module 209 and then combined to form the (overall) evaluation 211, i.e. an overall AD QoS value (depending on which the system switches to the other processing chain 207, 208 as the active processing chain, for instance, or, if necessary, initiates an emergency maneuver or prompts the user to intervene (i.e. driving is only autonomous to a limited extent)).

Figure 3:
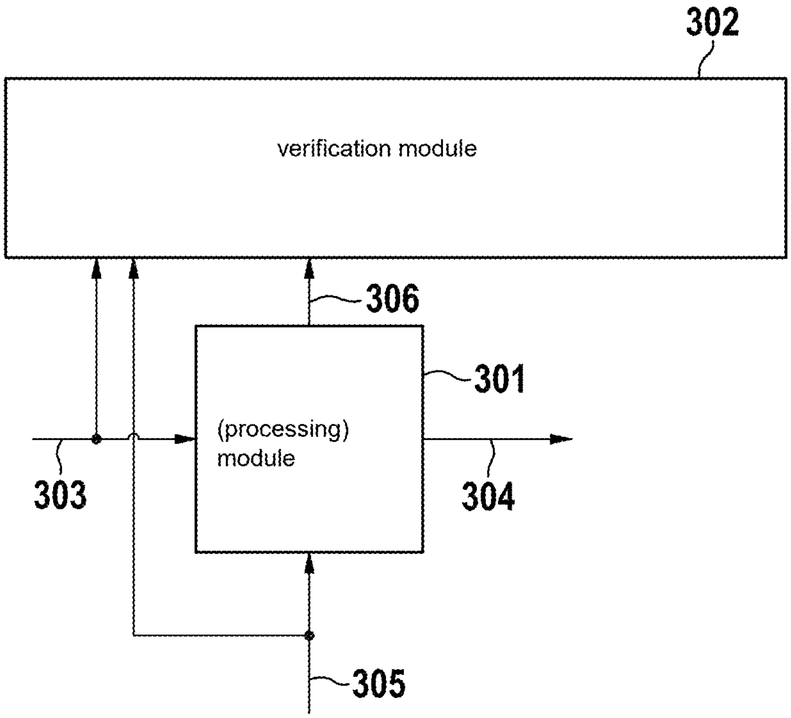
FIG. 3 illustrates the calculation of an AD (automatic driving) QoS (quality of service) value for a module by a verification module.

FIG. 3 illustrates the calculation of an AD QoS value for a (processing) module 301 by a verification module 302.

The module 301 receives an input 303 from the preceding module (the sensors 201 are also viewed here as one or more processing modules) and, according to a function, provides an output 304. It also receives a control signal 305, e.g. from an operating mode control device (mode manager), not shown in FIG. 3.

In addition to its actual output 304, it provides a status signal 306 (e.g. information about disturbances such as noise, etc., that affect its processing). The status signal 306 is received by the verification module 302. The verification module 302 can also receive the input 303 and the control signal 305.

Thus, multiple signals 303, 305, 306 are available to the verification module 302 for the calculation of the AD QoS value (i.e. for analysis for ascertaining the AD QoS) in the form of time series, i.e. a signal value for a specific (verification) time point, e.g. the following signals:

Input signal from the previous block

Information signal about disturbances and influences

Control Signal

According to various embodiments, each signal value of each of these signals is represented by one or more binary values, wherein each binary value indicates whether the respective signal value or a respective value derived from it has a standard value or not.

If the input 303 is a camera image, for example, it can be represented by a plurality of binary values, wherein each binary value indicates whether a respective discrete cosine transform (DCT) has a respective standard value or not. Disturbances could be represented in a similar manner based on a spectral analysis (i.e. binary values that indicate whether respective frequency components have standard values or not, e.g. when considering a disturbance in a specific time window). A mode (signal value of the control signal) can be assigned a standard value and a binary value can indicate whether it has the standard value or not (similarly for multiple modes or submodes).

For the sake of simplicity, it is assumed in the following that each one of the respective signals can be represented by a single binary value, wherein, for the following modeling, each binary value is regarded as a random variable with a Bernoulli distribution, which contains the information "standard value" (of the respective signal value) (value of the random variable equal 1) with probability p and contains the information "not standard value" of the respective signal value (value of the random variable equal 0) with probability q=p−1:

Input signal from the previous block: random variable $X_1$

Information signal about disturbances and influences: random variable $X_2$

Control signal: random variable $X_3$

There are therefore three binary values available at each verification time point.

These three binary values are now supplemented with a set of

Bernoulli random variable $X_i$ (i=4, . . . N), the values of which are ascertained randomly (e.g. uniformly distributed), so that values for $X_i$=0, 1 (i=1, . . . , N) are available for each verification time point. N is a power of two, for example, for instance N=256 or N=512.

For the following modeling, it is assumed that the Xi are interchangeable.

The probability for n standard values PN(n) is written as follows:

$$P_N(n) = {}_N C_n \cdot X_{n,N-n}$$

In this case, $N^c n$ is the binomial coefficient:

$$N^C n = \binom{N}{n}$$

The probability that $X_i$ occurs (i.e. has the value one and thus indicates that the standard value is present) corresponds (because it is Bernoulli distributed) to its expected value $\langle X_i \rangle$.

According to various embodiments, this probability considers the correlation between the input signal values. This means (especially for anomaly detection) that the conditional expected value for the probability that the respective random variable has the value one "has occurred" is used. For $X_{k+1}$, this is denoted as $p_{i,j}$ (or also $p_{ij}$), wherein k=i+j. The index i, j (or ij) means that this is the probability that $X_{k+1}$ occurs if i of $X_1, \ldots, X_k$ has occurred and j of $X_1, \ldots, X_k$ have not occurred. This means that if $X_{i,j}$ is also written as $$X_{ij} = \langle \Pi_{ij} \rangle$$

then $$p_{ij} = \langle X_{i+j+1} | \Pi_{ij} = 1 \rangle = \frac{X_{i+1j}}{X_{ij}}$$

and analogously $$q_{ij} = \langle 1 - X_{i+j+1} | \Pi_{ij} = 1 \rangle = \frac{X_{ij+1}}{X_{ij}}$$

Figure 4:
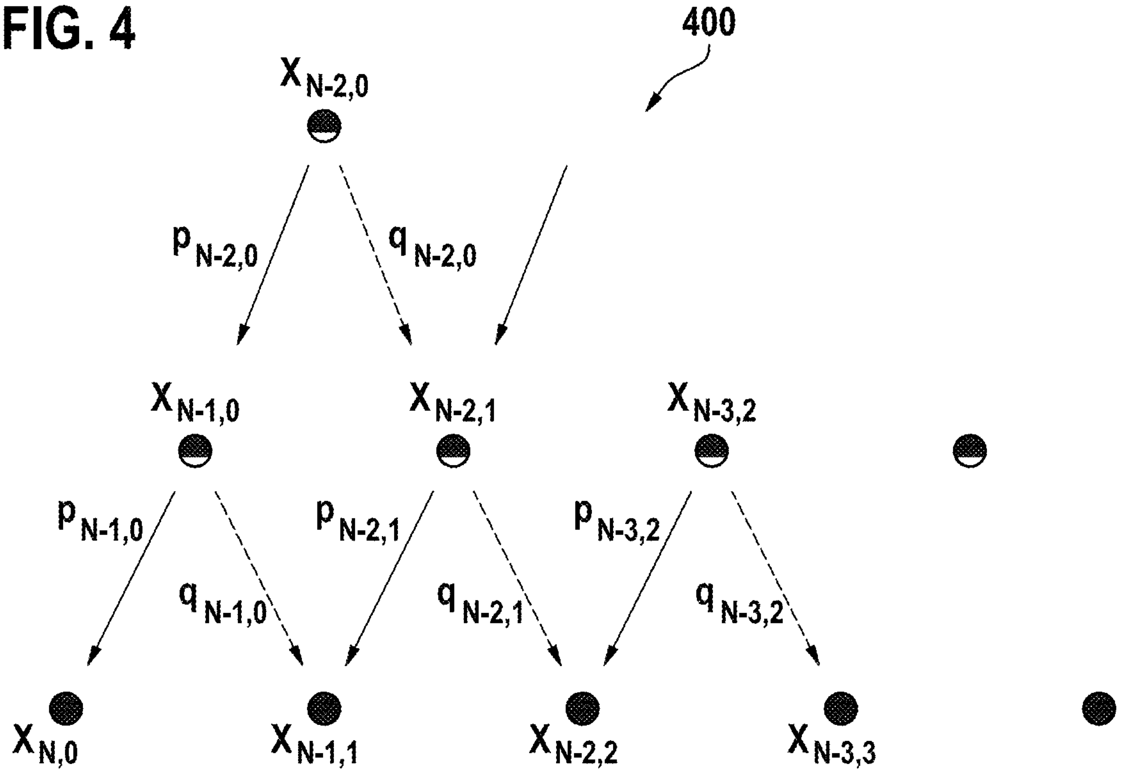
FIG. 4 shows a Pascal triangle.

FIG. 4 illustrates these relationships in the form of a Pascal triangle 400.

P0.0 is the unconditional expected value that is nothing other than the standard value probability (default probability) pd.

A conditional correlation is introduced analogously.

For the (unconditional) correlation between $X_i$ and $X_j$, the following applies $$\rho = \mathrm{Corr}(X_i, X_j) = \frac{\langle X_i X_j \rangle - \langle X_i \rangle \langle X_j \rangle}{\sqrt{\langle X_i \rangle (1 - \langle X_i \rangle) \langle X_j \rangle (1 - \langle X_j \rangle)}}$$

Analogous to the above definition of $p_{i,j}$ and $q_{i,j}$, the conditional correlation $\rho_{i,j}$ (or $\rho_{ij}$) is the correlation between $X_{k+1}$ and $X_{k+2}$ if i of $X_1, \ldots, X_k$ have occurred and j of $X_1, \ldots, X_k$ have not occurred. This can be written as $$\rho_{ij} = \mathrm{Corr}(X_{i+j+1}, X_{i+j+2} | \Pi_{ij} = 1)$$

$\rho_{0,0}$ is the unconditional correlation $\rho_d$.

The quantities introduced above satisfy the following relationships:

$$p_{i+1,j} = p_{i,j} + (1 - p_{i,j})\rho_{i,j},$$

$$q_{i,j+1} = q_{i,j} + (1 - q_{i,j})\rho_{i,j},$$

$$p_{i-1j} - p_{i,j-1} = -(1 - p_{i-1j})\rho_{i-1j} - p_{i,j-1}\rho_{i,j-1}$$

Using these recursive relationships, it is possible to estimate $P_{i,j}$ and $\rho_{i,j}$ from $P_N(n)$ or $X_{n,N-n}$. The $X_{n,N-n}$ lie on the lowest level of the Pascal triangle of FIG. 4. Solving the above equations recursively up to the uppermost point (0, 0) of the Pascal triangle, yields all $p_{i,j}$ and $\rho_{i,j}$. For example, to obtain $P_{N-1,0}$, the relationships $$X_{N,0} = X_{N-1,0} \cdot p_{N-1,0} \text{ und}$$

$$X_{N-1,1} = N_{-1,0} \cdot (1 - p_{N-1,0})$$

can be used:

$$p_{N-1,0} = \frac{X_{N,0}}{X_{N,0} + X_{N-1,1}}$$

$p_{i,j}$ for general i, j≤N−1 can be ascertained in a similar manner.

It is therefore also possible to estimate the correlation structure for each PN (n). In addition to the theoretical models, empirically obtained probability functions can be examined as well. If the Xi are interchangeable, the obtained $p_{i,j}$ and $\rho_{i,j}$ are the probabilities and correlations defined in the above equations. In network terminology, the interchangeable case corresponds to the complete graph $K_N$, in which all of the nodes are equally strong. If the network structure is not uniform, the Xi are not interchangeable. The above method is applicable even in such a case, and provides a lot of insight into the system. For example, if the network structure is tree-like, the obtained correlation structure should look completely different than in the interchangeable case. Its singular behavior strongly suggests a non-uniform network structure of the system.

A joint probability model for the $X_i$ can generally be defined by a mixing function f(p), which expresses the joint probability distribution by writing $X_{i,j}$ as $$X_{i,j} = \int f(p')p'^{i}(1-p')^{j}dp'$$

In this joint probability model, the correlation can now be expressed with a common random value y (of a random variable Y) and a (default) correlation $\rho_d$ by using the following mixing function:

In this case, Φ is the (cumulative) distribution function of the normal distribution (or also copula function for approximating the joint probability distribution; the mean is zero and the standard deviation is one) and Y is normally distributed:

$$Y \sim N(0,1)$$

$$f(p(y)) = \Phi\left(\frac{K - \sqrt{\rho_d}\, y}{\sqrt{1-\rho_d}}\right)$$

The correlation can be written in the form of the copula function, $$\rho_d = \frac{X_{2,0} - p_d^2}{p_d(1-p_d)}$$

(see the above formula for the correlation ρ).

The default probability for a verification time point can be estimated from the values of the random variables $X_1, \ldots, X_N$ for the verification time point:

$$p_d = \frac{\sum_{i=1}^{N} x_i}{N}$$

The probability X2.0 can be estimated analogously by averaging the products of the two binary values over all possible pairs of the random variables X1, . . . , XN.

The conditional probability can be ascertained from this by $$p_{i,j} = \frac{p_d(1-\rho_d) + i \cdot \rho_d}{1 + (k-1)\rho_d}$$

Based on the joint probability distributions, the probabilities $p_{i,j}$ can therefore be described as a linear function.

This calculation is also possible in real time on embedded systems.

The AD QoS value for the module 301 is now the maximum of pi,j:

$$AD\ QoS = \max_i \{p_{i,j}\}$$

It is considered an anomaly, for example, if AD QoS exceeds a specified threshold value $p_{i,j,max}$. In other words, $\max_i \{p_{i,j}\}$ serves as the primary anomaly parameter.

The above-described approach for ascertaining an AD QoS value for a module 301, or an (overall) AD QoS value for a processing chain 207, 208, can be used in embedded systems and/or for real-time verification, because the various signals (in the respective processing chain, in particular for autonomous driving) occur, are combined analytically, and therefore the consistency of the signals is checked analytically. Operational complexity is o (n*ln n), wherein n is the number of binary values being considered. It can very easily be supplemented with additional to-be-tested (in particular redundant) signals (i.e. further input signals for the verification module 302 can easily be added). The latter is in particular advantageous over an approach based on artificial intelligence. There is also no need for a learning algorithm or a database with training data. The stochasticity of the input signals can be documented ahead of time from data sheets and previous model details.

The AD QoS values of multiple modules 201-206 (the sensors are also viewed as modules) could be combined as mentioned above to one (scalar) AD QoS value for a processing chain 207, 208 (or another block that contains the modules 201-206), or considered as a vector values evaluation for this purpose:

$$\text{Block } AD\,QoS \text{ value} = (AD\,QoS \text{ Value\_Module\_1}, AD\,QoS \text{ Value\_Module\_2}, \ldots, AD\,QoS \text{ Value\_Module\_M})$$

The QoS of a block can also be determined by observing the QoS of subordinate building blocks; for example the QoS value of a processing chain is ascertained based on the QoS of sensors and actuators as perceived by the processing chain (e.g. by using input signals for the AD QoS calculation by a verification module 302 of the processing chain that reflect the QoS of the sensors and actuators).

To compare the QoS of two building blocks (modules) or groups (blocks of modules), e.g. to compare the QoS values of two processing chains 207, 208, a metric ||QoS Block/QoS Group|| is used. Such a metric can be defined such that it reflects the comparison of the QoS status of two equivalent building blocks or groups, e.g. QoS of Block 1 better than QoS of Block 2, then ||AD QoS—Value_Blocl_1||>|| AD QoS–Value Block 2||. For a more general metric (that can also compare blocks that are not equivalent), QoS states of building blocks or groups of building blocks are weighed (e.g. QoS (individual) values are weighted differently).

Depending on the AD QoS value for a module 301 (or also a block of modules) (such as a processing chain 207, 208), the current QoS status (or the current operating ability of the module or the respective system) can be divided into different classes. Table 1 provides an example of this.

TABLE 1

| Class | Operating ability | Functional impact on autonomous driving | AD QoS value |
|---|---|---|---|
| Normal | Full performance | — | 75 . . . 100% |
| Tolerable | Reduced performance | No functional impact on the output of the subsequent module | 50 . . . 75% |
| Restricted | Reduced performance | Functional impact on the output of the subsequent module | 25 . . . 50% |
| Insufficient | Reduced performance | Loss of output of the subsequent module | 0 . . . 25% |

Depending on the class of QoS status of a processing chain 207, 208, a degradation level of autonomous driving is selected, for example:

Normal->autonomous control

Tolerable->autonomous control with restrictions such as a speed limit

Restricted->stopping at a safe position/at the edge of the road/on the road (downgrades can be made here depending on the AD QoS value)

Insufficient->emergency maneuver

If, as in the example of FIG. 2, there are redundant elements, e.g. two processing chains 207, 208, it is possible to switch which element is active and which element or elements serve as fallback, depending on the QoS status of the elements, e.g. of the processing chains 207, 208.

For example, if the upper processing chain 207 is active and the lower processing chain 208 serves as fallback, the lower processing chain 208 is switched to active as soon as one of the modules of the upper processing chain 207 has a QoS status that is classified as insufficient. It is also possible to regularly check which processing chain 207, 208 has the higher QoS value or the better QoS status class and used this as the active processing chain (e.g. in response to the difference between the QoS values exceeding a certain threshold value).

The degradation level is based on the active processing chain.

If both processing chains 207, 208 are impaired at the same time (e.g. due to rain), the AD QoS value of both processing chains 207, 208 decreases. In this case, therefore, there is no change in which processing chain 207 is active and which serves as fallback element.

If only one of the two processing chains 207, 208 is impaired, for example due to a hardware failure, only its AD QoS value decreases. If it falls below the AD QoS value of the other processing chain (e.g. by a specific minimum difference to avoid a ping-pong effect), the other processing chain is activated and the impaired processing chain serves as fallback element (or, if the impairment is significant and the AD QoS value accordingly drops sharply, it is classified as untrusted). If the impairment ceases (e.g. the hardware error is resolved), and the AD QoS value of the originally active processing chain rises again (sufficiently) above the AD QoS value of the other processing chain, the system switches back again, for example.

Figure 5:
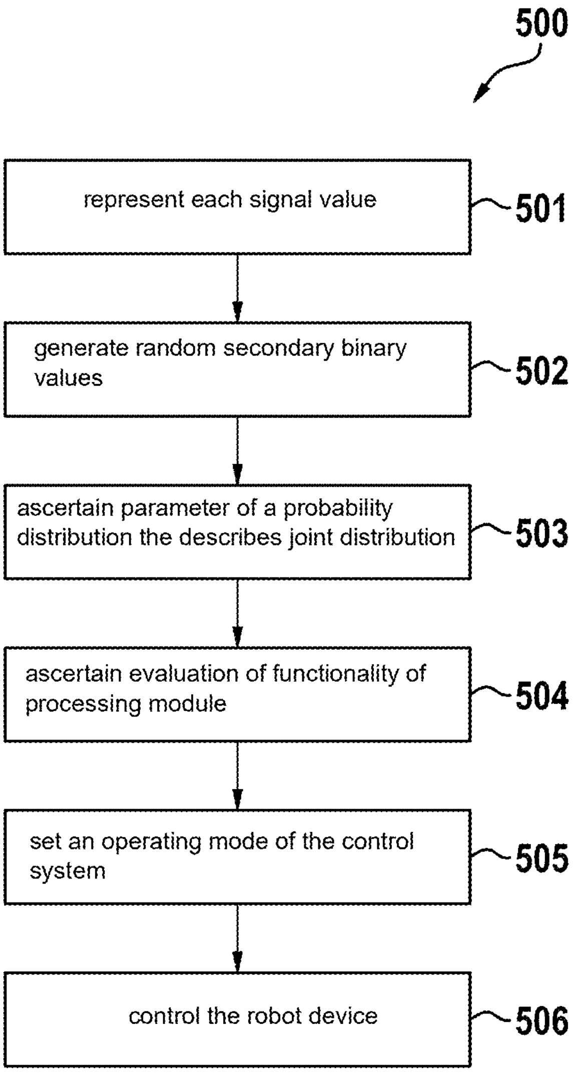
FIG. 5 shows a flow chart illustrating a method for controlling a robot device according to one example embodiment of the present invention.

In summary, according to various embodiments, a method is provided as shown in FIG. 5.

FIG. 5 shows a flow chart 500 illustrating a method for controlling a robot device according to one embodiment.

For each processing module of one or more processing modules (e.g. perception module, planning module, etc.) of a control system of the robot device, the method comprises In 501, representing each signal value of a plurality of signal values received or generated by the processing module (for a specific processing cycle or processing time) (e.g. an input signal, a control signal (e.g. mode signal), or an information signal relating to disturbances) as at least one (respective) first binary value that indicates whether the signal value, or a respective value which is derived from and characterizes said signal value (e.g. a coefficient resulting from a spectral analysis of the signal value), has a respective standard value or not. A signal value can also be a vector, e.g. a camera image with values for many pixels or another data element with values for multiple components. In other words, the signal value can be an element in a higher-dimensional space (i.e. the range of values can be higher-dimensional).

In 502, generating a plurality of random second binary values (from the output of a random number generator or pseudo-random number generator, e.g. as bit positions of a random value).

In 503, ascertaining a parameter (in the above example, the parameter $p_{i,j}$ or the maximum over $p_{i,j}$) of a probability distribution that describes the joint distribution of a set of binary values containing the first binary values and the second binary values.

In 504, ascertaining an evaluation of the functionality of the processing module based on the ascertained parameter.

In 505, setting an operating mode of the control system depending on said evaluation.

In 506, controlling the robot device using an output of the processing module.

The method described with reference to FIG. 5 can in particular be used to detect anomalies in the control system and respond to them by appropriately setting the operating mode (e.g. switching to a safe mode).

The method of FIG. 5 can be carried out by one or more computers comprising one or more data processing units. The term "data processing unit" can be understood to mean any type of entity that enables the processing of data or signals. The data or signals can, for example, be processed according to at least one (i.e. one or more than one) specific function carried out by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination thereof. Any other way of implementing the respective functions described in more detail here can also be understood as a data processing unit or logic circuitry. One or more of the method steps described in detail here can be carried out (e.g. implemented) by a data processing unit by means of one or more specific functions executed by the data processing unit.

According to various embodiments, therefore, the method is in particular computer-implemented.

The processing module (or a processing chain of processing modules) can receive and process time series of sensor data from various sensors, such as video, radar, LiDAR, ultrasonic, movement, temperature, pressure, force, etc. to generate control signals for controlling the robot device.

The approach of FIG. 5 is used to generate a control signal for a robot device. The term "robot device" can be understood to mean any technical system (comprising a mechanical part the movement of which is controlled), such as a computer-controlled machine, a vehicle, a household appliance, a power tool, a manufacturing machine, a personal assistant or an access control system.

The invention claimed is:

1. A method for controlling a robot device, comprising, for each processing module of one or more processing modules of a control system of the robot device:

- representing each signal value of a plurality of signal values received or generated by the processing module as at least one first binary value that indicates whether the signal value, or a respective value which is derived from and characterizes the signal value, has a respective standard value or not;
- generating a plurality of random second binary values;
- ascertaining a parameter of a probability distribution that describes a joint distribution of a set of binary values containing the first binary values and the second binary values;
- ascertaining an evaluation of the functionality of the processing module based on the ascertained parameter;
- setting an operating mode of the control system depending on said evaluation; and
- controlling the robot device using an output of the processing module.

2. The method according to claim 1, wherein the control system includes at least two processing chains, of which one processing chain is active and at least one processing chain serves as fallback, wherein the processing module is part of the active processing chain, and wherein the setting of the operating mode includes switching from the active processing path to a processing path of the at least one processing path that serves as fallback, depending on the evaluation.

3. The method according to claim 1, wherein the evaluation is an estimation of a conditional probability that one of the binary values indicates that the signal value or the value derived from the signal value has the respective standard value, provided that each binary value of a specific first number of at least some of the binary values indicates that the respective signal value or the respective value derived from the signal value has the respective standard value and each binary value of a specific second number of at least some of the binary values indicates that the respective signal value or the respective value derived from the respective signal value does not have the respective standard value.

4. The method according to claim 3, further comprising calculating the estimate of the conditional probability based on an estimate of the probability that a given binary value of the binary values indicates the standard value, wherein the estimate of the probability is ascertained by averaging the binary values and based on an estimate of a correlation of the binary values, wherein the estimate of the correlation is ascertained by averaging pairwise products of the binary values.

5. The method according to claim 4, further comprising ascertaining the estimate of the conditional probability by linearly linking the first number, the second number, the estimate of the probability that a given binary value of the binary values indicates the standard value, and the estimate of the correlation of the binary values.

6. The method according to claim 1, wherein the setting of the operating mode of the control system includes selecting an operating mode from a set of operating modes that differ in how autonomous the robot device is in the operating modes.

7. The method according to claim 6, wherein the operating mode is set such that the lower the evaluation of the functionality of the processing module, the lower the autonomy of the robot device.

8. The method according to claim 6 wherein the robot device is a vehicle and the set of operating modes includes an operating mode in which the vehicle drives autonomously.

9. A control device configured to controlling a robot device, the control device configured to, for each processing module of one or more processing modules of a control system of the robot device:

- represent each signal value of a plurality of signal values received or generated by the processing module as at least one first binary value that indicates whether the signal value, or a respective value which is derived from and characterizes the signal value, has a respective standard value or not;
- generate a plurality of random second binary values;
- ascertain a parameter of a probability distribution that describes a joint distribution of a set of binary values containing the first binary values and the second binary values;
- ascertain an evaluation of the functionality of the processing module based on the ascertained parameter;
- set an operating mode of the control system depending on said evaluation; and
- control the robot device using an output of the processing module.

10. A non-transitory computer-readable medium on which is stored instructions for controlling a robot device, the instructions, when executed by a processor, causing the processor to perform, for each processing module of one or more processing modules of a control system of the robot device:

- representing each signal value of a plurality of signal values received or generated by the processing module as at least one first binary value that indicates whether the signal value, or a respective value which is derived from and characterizes the signal value, has a respective standard value or not;
- generating a plurality of random second binary values;
- ascertaining a parameter of a probability distribution that describes a joint distribution of a set of binary values containing the first binary values and the second binary values;
- ascertaining an evaluation of the functionality of the processing module based on the ascertained parameter;
- setting an operating mode of the control system depending on said evaluation; and controlling the robot device using an output of the processing module.

* * * * *